(12) United States Patent
Tay et al.

(10) Patent No.: US 8,983,304 B2
(45) Date of Patent: Mar. 17, 2015

(54) OPTO-ISOLATOR WITH COMPENSATION CIRCUIT

(71) Applicant: Avago Technologies General IP (Singapore) Pte. Ltd., Singapore (SG)

(72) Inventors: Thiam Siew Tay, Singapore (SG); Gopinath Massi, Singapore (SG); Soo Kiang Ho, Singapore (SG); Peng Siang Seet, Singapore, SC (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 133 days.

(21) Appl. No.: 13/660,351

(22) Filed: Oct. 25, 2012

(65) Prior Publication Data

US 2014/0119740 A1 May 1, 2014

(51) Int. Cl.
*H04B 10/00* (2013.01)

(52) U.S. Cl.
USPC .......................... 398/158; 398/162; 398/164

(58) Field of Classification Search
CPC .......... H03K 17/0029; H01L 2924/00; H05B 39/04; H05B 33/0845
USPC ........................................ 398/158, 162, 164
See application file for complete search history.

(56) References Cited

U.S. PATENT DOCUMENTS

| | | | | |
|---|---|---|---|---|
| 5,448,077 | A * | 9/1995 | Krause | 250/551 |
| 5,465,298 | A * | 11/1995 | Wilkison et al. | 379/406.02 |
| 5,677,779 | A * | 10/1997 | Oda et al. | 398/137 |
| 5,812,296 | A * | 9/1998 | Tarusawa et al. | 398/116 |
| 6,777,703 | B2 | 8/2004 | Morikawa | |
| 7,132,805 | B2 * | 11/2006 | Young | 315/308 |
| 7,586,274 | B2 * | 9/2009 | Primiano | 315/291 |
| 7,656,371 | B2 * | 2/2010 | Shimizu et al. | 345/83 |
| 7,734,191 | B1 * | 6/2010 | Welch et al. | 398/192 |
| 7,839,295 | B2 * | 11/2010 | Ries, II | 340/815.45 |
| 7,877,023 | B2 | 1/2011 | Uto | |
| 8,111,011 | B1 * | 2/2012 | Tu et al. | 315/307 |
| 2004/0173346 | A1 * | 9/2004 | Byrnes et al. | 165/253 |
| 2006/0012588 | A1 * | 1/2006 | Shinohara | 345/204 |
| 2008/0118252 | A1 | 5/2008 | Chow et al. | |
| 2010/0072898 | A1 * | 3/2010 | Ohashi et al. | 315/127 |
| 2010/0109545 | A1 * | 5/2010 | Eiring et al. | 315/246 |
| 2010/0155627 | A1 * | 6/2010 | Baumgartner et al. | 250/551 |
| 2010/0193803 | A1 * | 8/2010 | Liu et al. | 257/81 |
| 2010/0289555 | A1 * | 11/2010 | Cheng | 327/524 |
| 2010/0327195 | A1 * | 12/2010 | Huang et al. | 250/551 |
| 2011/0006684 | A1 * | 1/2011 | Hodgson et al. | 315/77 |
| 2011/0069960 | A1 * | 3/2011 | Knapp et al. | 398/103 |
| 2012/0076455 | A1 * | 3/2012 | Siew et al. | 385/14 |
| 2012/0140531 | A1 * | 6/2012 | Lin | 363/21.12 |
| 2012/0213466 | A1 * | 8/2012 | Golubovic et al. | 385/14 |
| 2012/0280681 | A1 * | 11/2012 | David et al. | 324/251 |
| 2013/0039648 | A1 * | 2/2013 | Uo | 398/25 |

OTHER PUBLICATIONS

Bajenesco, T , "CTR Degradation and Ageing Problem of Optocouplers", http://ieeeexplore.ieee.org/xpl/freeabs_all.isp?arnumber=499774>; Oct. 24-28, 1995 , 173-175.

* cited by examiner

*Primary Examiner* — David Payne
*Assistant Examiner* — Pranesh Barua

(57) ABSTRACT

An opto-isolator with a compensation circuit is disclosed. The compensation circuit may be configured to compensate degradation of the light source of the opto-isolator. The compensation circuit may comprise a circuit for counting an extended use of the isolator. When the count value exceeds a predetermined count value, the compensation circuit may be configured to compensate the degradation of the light source by adjusting the driver of the light source. In another embodiment, an electrical control system having such opto-isolator is illustrated.

20 Claims, 11 Drawing Sheets

OPTO-ISOLATOR WITH COMPENSATION CIRCUIT

BACKGROUND

A galvanic isolator provides a means for moving a signal from one electrical circuit to another electrical circuit in a control system when the two electrical circuits must otherwise be electrically isolated from one another. Usually the two electrical circuits operate at different voltages, and thus, must be electrically isolated. For example, consider an application in which a 5V battery powered controller board is configured to control a motor circuit operating at 240V. In this example, it is essential to electrically isolate the 240V motor circuits from the 5V controller circuit, while permitting the 5V controller circuit to send or receive signals from the 240V motor circuit. In this type of application, an isolator may be used to provide voltage and noise isolation, while permitting the information exchange between the two circuit systems. Opto-isolator, also known as optocoupler, is one of the most commonly used galvanic isolators.

Generally, an opto-isolator comprises an optical emitter and an optical receiver. Over time, degradation may occur and optical signals emitted from the optical emitter may become weak, and eventually the optical emitter may fail to function. For many control systems, failure of such optical parts may be vulnerable and may be dangerous as the control systems may be relying on the optical signals to control fast moving motors or machinery parts. It may be desirable to take preventive steps to replace the parts before complete failure, or to address the degradation to prolong the lifetime of the opto-isolators.

BRIEF DESCRIPTION OF THE DRAWINGS

Illustrative embodiments by way of examples, not by way of limitation, are illustrated in the drawings. Throughout the description and drawings, similar reference numbers may be used to identify similar elements. The drawings are for illustrative purpose to assist understanding and may not be drawn per actual scale.

DETAILED DESCRIPTION

Figure 1:
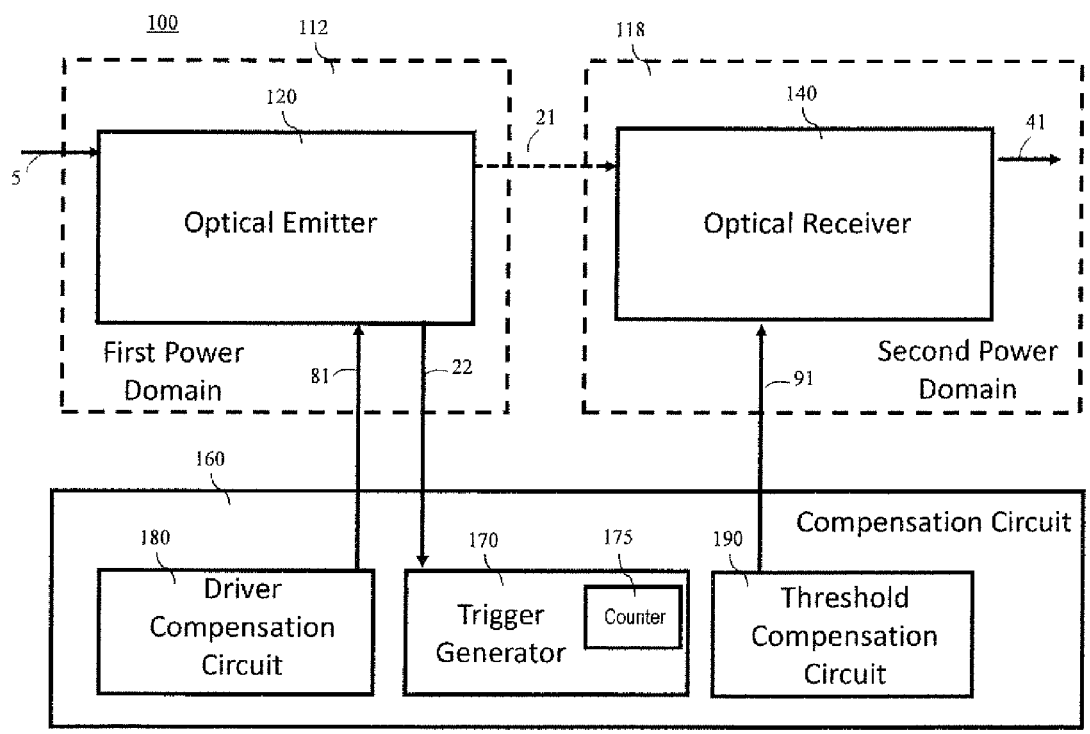
FIG. 1 illustrates a block diagram of an opto-isolator having a compensation circuit.

FIG. 1 illustrates a block diagram of an opto-isolator 100. The opto-isolator 100 may comprise an optical emitter 120, an optical receiver 140, and a compensation circuit 160. The compensation circuit 160 may comprise a trigger generator 170, a driver compensation circuit 180 and a threshold compensation circuit 190. The optical emitter 120 may be configured to receive an electrical input signal 5 from a first control circuit (not shown), and to generate emitted light or an optical signal 21 for a least a plurality of fixed predetermined on-periods. The optical signal 21 is to be detected by the optical receiver 140 arranged proximate to the optical emitter 120. The optical receiver 140 may be configured to receive a first portion of the emitted light and convert the optical signal 21 into an electrical output signal 41. The optical emitter 120 may not have electrical connection to the optical receiver 140 as signal transmission is carried out through the optical signal 21.

In the embodiment of FIG. 1, the optical emitter 120 is electrically isolated from the optical receiver 140. The optical emitter 120 may be configured to draw power from a first power supply (not shown) configured to supply electrical power to components located in a first power domain 112, whereas the optical receiver 140 may be configured to draw power from a second power supply (not shown) configured to supply electrical power to components located in a second power domain 118. The first and second power domains 112, 118 may be at different voltage levels. In some applications, the first and second power domains may be of the same voltage level but due to noise and cross talk considerations, the first and second power domains 112, 118 may be required to be electrically isolated.

As shown in FIG. 1, the optical emitter 120 may reside within the first power domain 112 whereas the optical receiver 140 may reside in the second power domain 118. The compensation circuit 160 may reside in either the first power domain 112, the second power domain 118, or even a third power domain not connected to the first or second power domains 112, 118. Alternatively, the compensation circuit 160 may reside partially in the first power domain 112, and partially in the second power domain 118.

The optical emitter 120 may be integrated onto a photo emitter die (not shown) whereas the optical receiver 140 may be integrated onto a photo detector die (not shown). Each of the photo emitter die (not shown) and the photo detector die (not shown) may be respective single monolithic semiconductor substrates. The optical emitter 120 may be isolated from the optical receiver 140 being physically in different semiconductor dies. In addition, in some applications, an isolation layer (not shown) may be added to shield electrically any noise, crosstalk or signals between the dies. The compensation circuit 160 may reside partially in one or both the photo emitter and photo detector dies 112, 118. Alternatively, the compensation circuit 160 may reside entirely in one of the photo emitter and photo detector dies 112, 118, or in a completely different semiconductor die (not shown).

The optical emitter 120 may be a light emitting diode (referred hereinafter as "LED") or any other light source suitable to generate light. The terms "light" and "optical" as used herein may be visible and/or invisible. All possible variations of electromagnetic waves should be taken into consideration when a specific type of light or radiation or optical emitter or optical receiver or optical signal is discussed, unless explicitly expressed otherwise. For example, ultra-violet, infrared and other invisible radiation should be included when considering the term "light" or optical as used herein, even though light may often be used in the art to refer to radiation that is visible to the human eye.

The optical receiver 140 may be a photodiode, a phototransistor or any other sensors capable of detecting the optical signal 21 emitted by the optical emitter 120. The optical receiver 140 may comprise amplifier circuits (no shown), filtering circuits (not shown) or any other circuits that may improve the performance of the optical receiver 140.

As will be discussed herein in further details in subsequent embodiments, the optical emitter 120 may be configured to generate emitted optical signal 21 or light for at least a plurality of fixed predetermined on-periods in response to the electrical input signal 5. The optical receiver 140 may be configured to detect the plurality of fixed predetermined on-periods and to decode the optical signal 21 into the electrical output signal 41. The electrical input signal 5 may be information to be transmitted over from the first power domain 112 to the second power domain 118. Each predetermined on-periods of the optical signal 21 may correspond to each bit of the information of the electrical input signal 5.

The compensation circuit 160 may comprise a counter 175 within the trigger generator 170. The counter 175 may be configured to count incrementally after an extended use period. The compensation circuit 160 may be configured to send a drive compensation signal 81 to the optical emitter 120 through the driver compensation circuit 180, or a threshold compensation signal 91 to the optical receiver 140 through the threshold compensation circuit 190 when the count value exceeds a predetermined count value. The predetermined extended use period is significantly longer than the plurality of fixed predetermined on-periods. By counting extended use period instead of counting of each signal may be advantageous in the following ways. First, the count frequency may be very much reduced, thus saving power consumption of the counter 175. Second, the counter's length may be reduced. The trigger generator 170 may be coupled to a signal 22 from the optical emitter 120 indicative of whether the optical emitter 120 is emitting light. The trigger generator 170 may be a circuit configured to monitor the use of the optical emitter 120. The counter 175 may be configured to count substantial use that takes place over an extended use period of the optical emitter 120 but not each individual count of use as explained hereinafter. The extended use period may not be a fixed number, but may be sufficient for coarse calculation used to estimate the degradation of the optical emitter 120.

For example, in one embodiment, the optical emitter 120 may deteriorate by 2% after few hundred trillions times of the predetermined on-periods. Compensation signals may not be needed until the optical emitter 120 deteriorates by 50%. A counter for this may be too huge, may consume too much power and may be too ineffective, because precise counting may require a huge counter, and frequent counting of every signal may consume significant power consumption. In contrast, as will be discussed in further details hereinafter, the trigger generator 170 may be configured to respond to substantial usage of the optical emitter 120, or to monitor coarse usage, as the counter 175 may be configured to count extended time period and not every single count.

The optical emitter 120 may deteriorate over time or more specifically over substantial usage. At a level where functionality of the optical emitter 120 may degenerate so as to become only marginally acceptable, it may be desirable to replace the optical emitter 120 or take precautionary steps. This may be required specifically when the opto-isolator 100 is used in high moving motor systems. A sudden break down of the opto-isolator 100 may be undesirable. This can be avoided because the break down or deterioration of the optical emitter 120 may be predictable with substantial characterization data. Therefore, by monitoring usage of the optical emitter 120 using the trigger generator 170, precautionary steps may be taken after substantial degradation.

When the predetermined extended use period is exceeded, usually after a substantive use, the counter 175 counts incrementally. When the count value exceeds a predetermined count value, the trigger generator 170 may be configured to trigger the driver compensation circuit 180 to output the drive compensation signal 81. Upon receiving the drive compensation signal 81, the optical emitter 120 may be configured to drive the optical emitter 120 with more power to generate more light. With stronger light, the lifetime of the optical emitter 120 may be extended further. This process may repeat until a user replaces the optical emitter 120, or the entire opto-isolator 100.

Similarly, when the predetermined count value is exceeded, the trigger generator 170 may be configured to trigger the threshold compensation circuit 190 to output the threshold compensation signal 91. Upon receiving the threshold compensation signal 91, the optical receiver 140 may be configured to adjust the threshold voltage and slightly lower down noise margin so that a weaker optical signal 21 can be detected. This may prolong the lifetime of the opto-isolator 100 until the optical emitter 120 or the entire opto-isolator 100 may be replaced. The trigger generator 170's output may be communicated to users via the output electrical signal 41.

In FIG. 1, the trigger generator 170 may be configured to trigger both the driver compensation circuit 180 and the threshold compensation circuit 190. In another embodiment, the trigger generator 170 may be configured to trigger one of the driver compensation circuit 180 and the threshold compensation circuit 190. The opto-isolator 100 may comprise one of the driver compensation circuit 180 and the threshold compensation circuit 190, but the opto-isolator may also comprise both the driver compensation circuit 180 and the threshold compensation circuit 190.

Figure 2A:
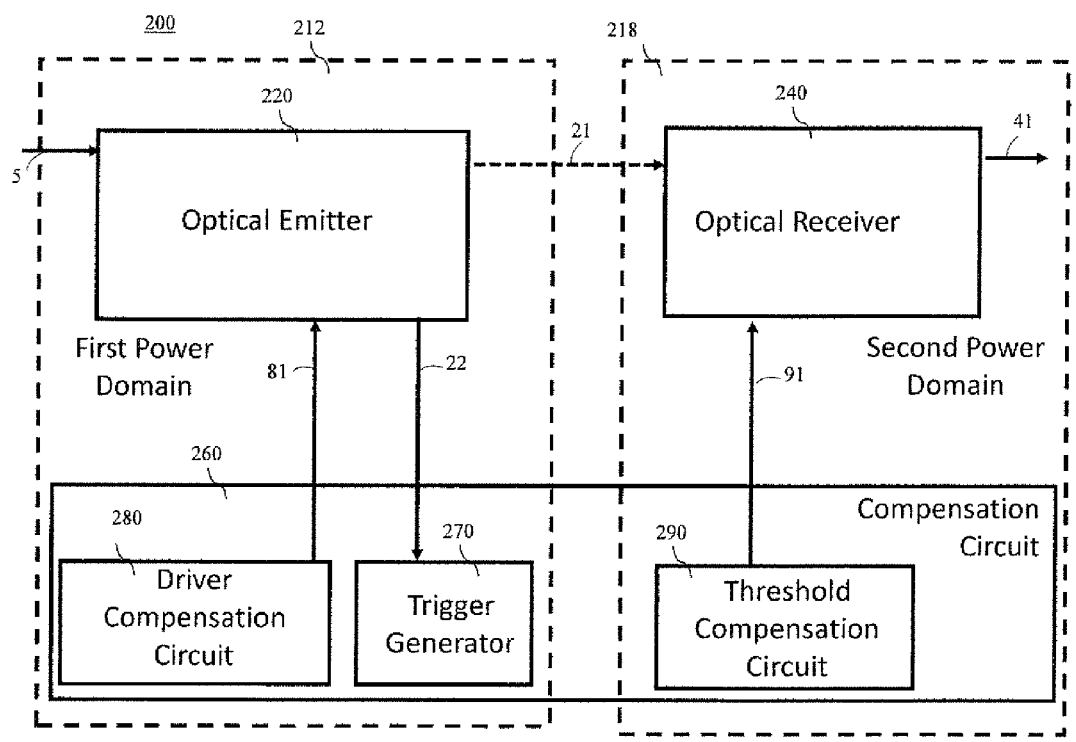
FIG. 2A illustrates a block diagram of an opto-isolator with the compensation circuit residing in both the photo emitter die and the photo detector die.

FIG. 2A illustrates a block diagram of an opto-isolator 200 with a compensation circuit 260. The opto-isolator 200 may comprise an optical emitter 220, an optical receiver 240 and a compensation circuit 260. The compensation circuit 260 may comprise a driver compensation circuit 280, a trigger generator 270 and a threshold compensation circuit 290. The optical emitter 220, the driver compensation circuit 280 and the trigger generator 270 may reside within a first power domain 212. The optical receiver 240 and the threshold compensation circuit 290 may reside within a second power domain 218. All the components residing on the first power domain 212 such as the optical emitter 220, the trigger generator 270 and the driver compensation circuit 280 may be integrated onto a single monolithic substrate of a photo emitter die (not shown) whereas all the components resided on the second power domain 218 such as the optical receiver 240 and the threshold compensation circuit may be integrated onto a single monolithic substrate of a photo detector die (not shown). In other words, the compensation circuit 260 may reside partially in the photo emitter die (not shown) and partially in the photo detector die (not shown).

Figure 2B:
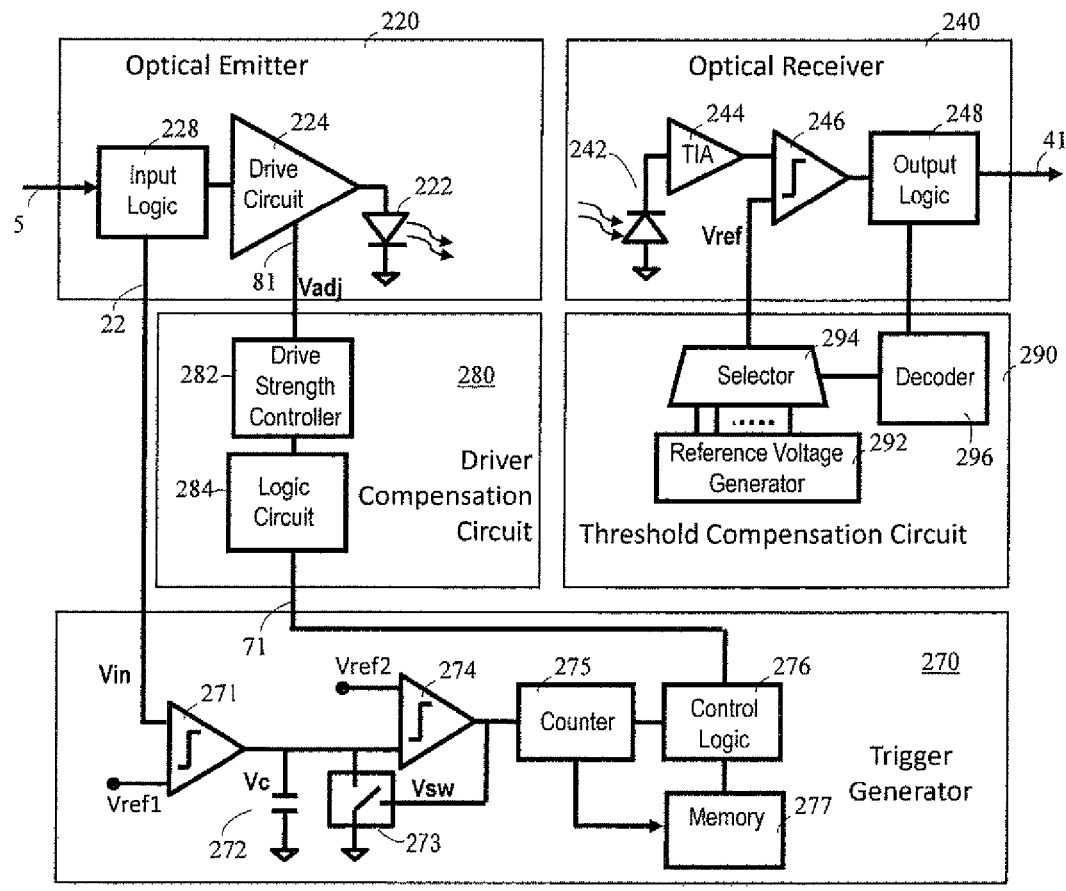
FIG. 2B illustrates a circuit diagram of the opto-isolator shown in FIG. 2A.

FIG. 2B illustrates a circuit diagram of the opto-isolator 200. The optical emitter 120 may comprise of an input logic 228, a drive circuit 224 and a light source 222. The input logic 228 may be configured to interface the electronic input signal 5. The drive circuit 224 may be configured to generate a drive current configured to drive the light source 222 to emit an optical signal 21 as shown in FIG. 2A. The drive circuit 224 may have a plurality of drive strength controllable through a control signal Vadj. The logic circuit 228 may be asynchronous circuit or synchronous circuit. The input logic 228 may be configured to output a signal 22 to the trigger generator 270. The signal 22 may be configured to carry a signal indicative that the light source 222 of the optical emitter 220 is in use. The signal 22 may be coupled to the input terminal Vin of the trigger generator 270.

Figure 2C:
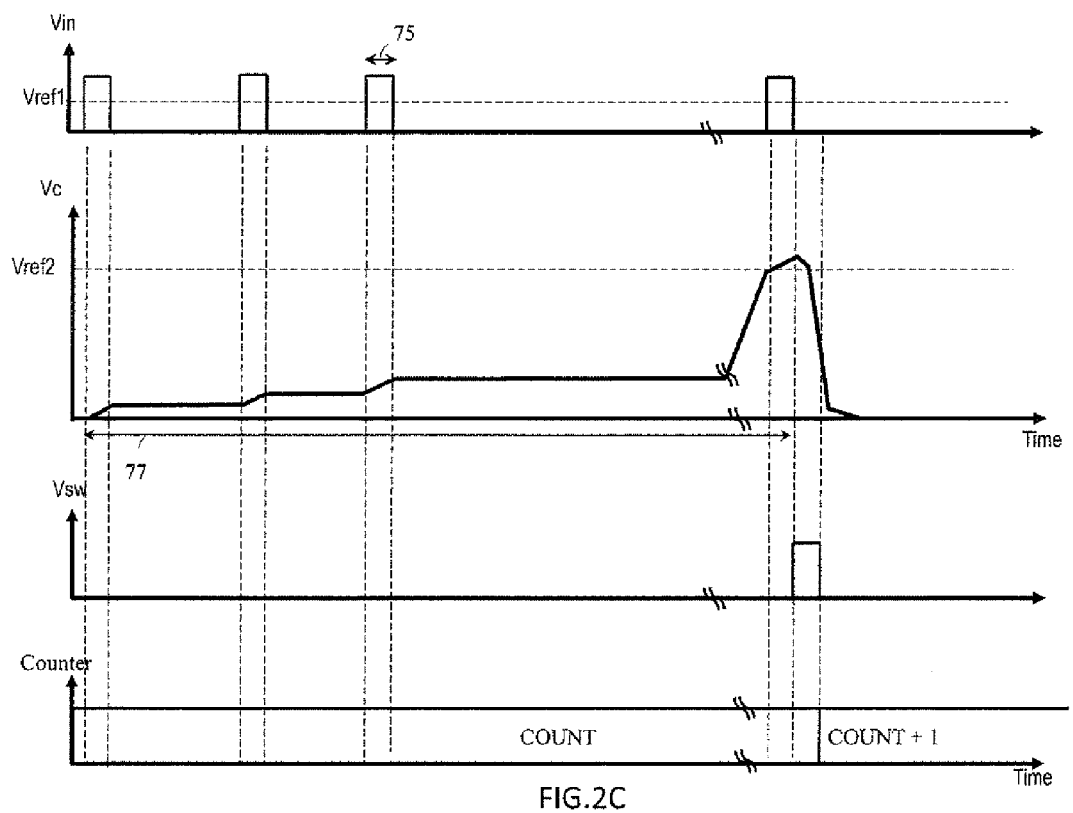
FIG. 2C illustrates a timing chart of the circuit diagram shown in FIG. 2B showing operation of the trigger generator.

The trigger generator 270 may be a switch capacitor circuit comprising a first comparator 271, a second comparator 274, a capacitor 272, a switch 273, a counter 275, a control logic 276 and a memory 277. When the input terminal Vin's voltage exceeds a predetermined reference value Vref1, the capacitor 272 may be configured to accumulatively store charges. When the charges get accumulated, the voltage over the capacitor 272, Vc may increase. This is illustrated in the graph shown in FIG. 2C. Vc increases corresponding to each time Vin turns high. When the signal at the input terminal Vin turns low, the capacitor 272 may stop accumulating charge and the voltage Vc across the capacitor 272 may remain. This process may continue until the voltage Vc exceeds a predetermined value Vref2. When Vc exceeds the predetermined threshold voltage Vref2, the comparator 274 may turn on the switch 273. When the switch 273 is turned on, the charges accumulated over the capacitor 272 may be reset. Accordingly, Vc may be reset as shown in FIG. 2C. Optionally, in addition to the second comparator 274, the switch 273 may be turned on via an input signal (not shown) from an external control circuit (not shown) in another embodiment.

The extended use period 77 may not be a fixed value, and may depend on how much turn-on time of the optical emitter 220. The extended use period 77 may be a coarse way of determining use of the optical emitter 220. In this manner, the counting by the counter 275 may not be a precise count. In one embodiment, the extended use period 77 may be ranging from 1000 to 100,000 times the fixed predetermined on-period 75. For example, consider the length of the counter 275 needed if the extended use period 77 is 10,000 times the fixed predetermined on-period. Compared to counting each individual fixed predetermined on-period 75, the counter 275 may be of a size of 14 bits less. Accordingly, the switching frequency of the counter 275 may be reduced by 10,000 times. In addition, power consumption of the counter 275, as well as other circuitry such as the optical emitter 220 and the optical receiver 240 may be significantly reduced compared to counting each fixed predetermined on-period 75.

Figure 2D:
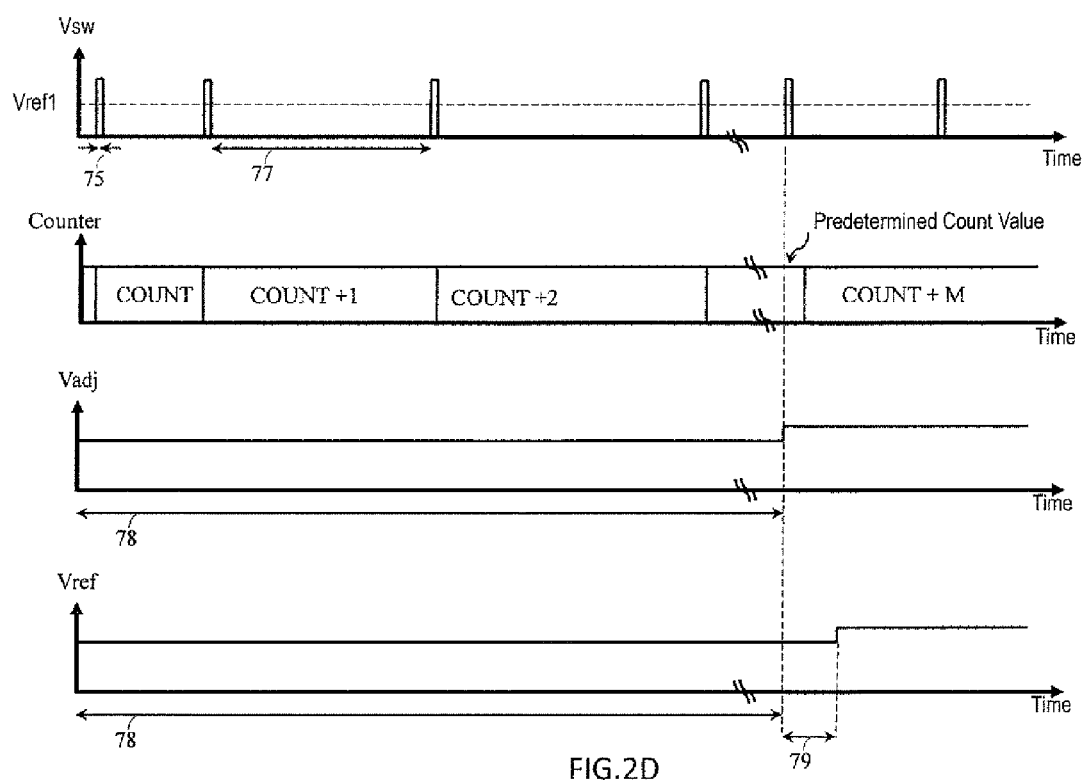
FIG. 2D illustrates a timing chart of the circuit diagram shown in FIG. 2B showing how the driver compensation circuit and the threshold compensation circuit respond to the trigger generator.

As shown in FIGS. 2C and 2D, the counter 275 may be configured to count incrementally each time when the switch 273 is turned on. This process may repeat until the counter 275 exceeds a predetermined count value. The time period 78 needed for the counter to exceeds the predetermined count value may be significantly larger than the extended use period 77. The count value may be stored in the memory 277 through the control logic 276. The memory 277 may be a non-volatile memory such as EEPROM. Alternatively, the memory 277 may be volatile memory such as a RAM but the value of the counter 275 may be transmitted and stored externally in a non-volatile memory. The control logic may produce a trigger signal 71 to the driver compensation circuit 280 when the counter 275 exceeds a predetermined count value. The trigger signal 71 may be referred as compensation signal because at least one function of the trigger signal 71 is to trigger the compensation circuit 260.

The value of the predetermined count value may be selected according to prediction of the lifetime of the light source 222. In one embodiment, the predetermined count value may be 5 million as the characterization data of the light source 222 indicates that light source 222 may be degrade by 10% after such use. The counter 275 shown in FIG. 2B may be a 20 bit counter operating at few Hertz in frequency. Recall that the counter 275 may be reset after an extended use period 77 which may be 1000 to 50,000 times the fixed predetermined on-period 75. If the counter 275 were to count each of the fixed predetermined on-period 75, the counter 275 may be more than 35 bit, and the count frequency may be at least few Mega Hertz of frequency. Consequently, it may be appreciated that high counter frequency, and huge counter may be avoided using the trigger generator 270 shown in FIG. 2B. The fixed predetermined on-period 75, the extended use period 77 and the predetermined count value may vary in other embodiments and may be higher than the numbers illustrated above as the lifetime for light source 222 with longer lifetime.

Referring to FIG. 2B, the driver compensation circuit 280 may comprise a drive strength controller 282 and a logic circuit 284. The logic circuit 284 may be configured to interface or to decode the trigger signal 71 into control signals needed in the drive strength controller 282. The drive strength controller 282 may comprise switching circuits or amplifier circuits configurable to produce the control signal Vadj. The control signal Vadj may be an analog signal. In one embodiment, when the control signal Vadj increases in voltage value, the drive circuit 224 of the optical emitter 220 may be configured to generate more drive current, thus, driving the light source 222 to emit more light. As shown in FIG. 2D, Vadj's value may remain substantially constant until when the counter 275 exceeds the predetermined count value, and the Vadj may be adjusted so that the drive strength of the drive circuit 224 is increased to compensate the degradation of the light source 222. The value of Vadj may be adjusted a few times. For example, the predetermined count value may be selected such that the Vadj may be adjusted each time, corresponding to when the light source 222 may increasingly degrade by increments of 10%.

Referring to FIG. 2B, the optical receiver 240 may comprise a photo detector 242, a trans-impedance amplifier (referred hereinafter as "TIA") 244, a comparator 246 and an output logic 248. The optical receiver 240 may be configured to convert optical signal 21 generated by the light source 222 into an electrical signal, which is subsequently amplified by the TIA 244. If the output of the TIA 244 exceeds a predetermined reference voltage Vref, the comparator 246 may be configured to generate an output signal to the output logic 248. The output logic 248 may be configured to translate the received signals into the electronic output signal 41.

The threshold compensation circuit 290 may comprise a reference voltage generator 292, a selector 294 and a decoder 296. Alternatively the threshold compensation circuit 290 may comprise a feedback amplifier circuit configured to generate the reference voltage Vref signal. As shown in FIGS. 2A and 2B, the compensation signal 71 emitted by the trigger generator 270 may reside in the first power domain 112. Thus, the compensation signal 71 is not electrically coupled to the optical receiver 240 nor the threshold compensation circuit 290. The compensation signal 71 may be transmitted over to threshold compensation circuit 290 via the optical emitter 220 and the optical receiver 240. The output logic 248 of the optical receiver 240 may be coupled into a decoder circuit 296 having shift registers and decoding logic. The output of the decoder 296 may be configured to control reference voltage value generated by the Reference Voltage Generator 292 via the selector 294. The selector 294 may comprise switching circuits.

Referring to FIG. 2D, the value of reference voltage, Vref generated by the Reference Voltage Generator 292 may be adjusted after the counter 275 exceeds the predetermined count value. However, the changes may occur slightly later with a time lapse 79. This may be due to the reason that the trigger generator 270 is located at the optical emitter 220, electrically isolated from the optical receiver 240 and the threshold compensation circuit 290. The time lapse 79 may be the time needed for the signal 71 to be transmitted over to the optical receiver 240 and the threshold compensation circuit 290 via the optical signal 22 as shown in FIG. 2A and FIG. 2B.

Figure 2E:
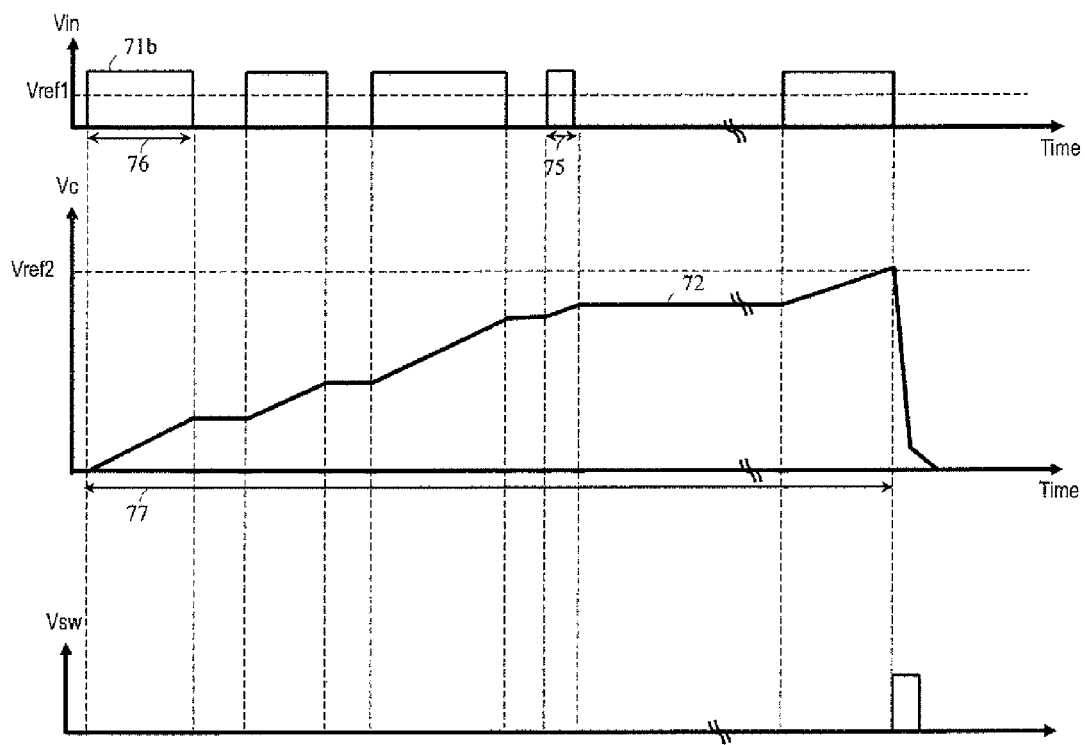
FIG. 2E illustrates a timing chart of the circuit diagram shown in FIG. 2B where the light source may be turned on for a non-fixed period of time.

The advantage of the trigger generator 270 over counting every pulse signal of the optical signal 22 may be because the trigger generator 270 may be used to monitor the on-period of the light source 222, rather than counting each light pulse. In some instances, the signal 22 may be configured to turn high, for example, when the light source 222 is turned on, as illustrated by Vin shown in FIG. 2E, and is not a pulse signal as shown in FIG. 2C. Unlike the graph shown in FIG. 2C, the on-period 76 of Vin may vary, and may be proportional to the light source 222 turn on time period. However, the on-period 76 of Vin may be minimally equal to the fixed predetermined on-period 75, as the light source 222 needs to be turned on for a minimum period of time to transmit the optical signal 21. In circumstances where the light source 222 may be turned on for non-fixed period, precise counting does not reflect actual use. In such case, the switch capacitor circuit used in the trigger generator 270 may be more effective.

Figure 3:
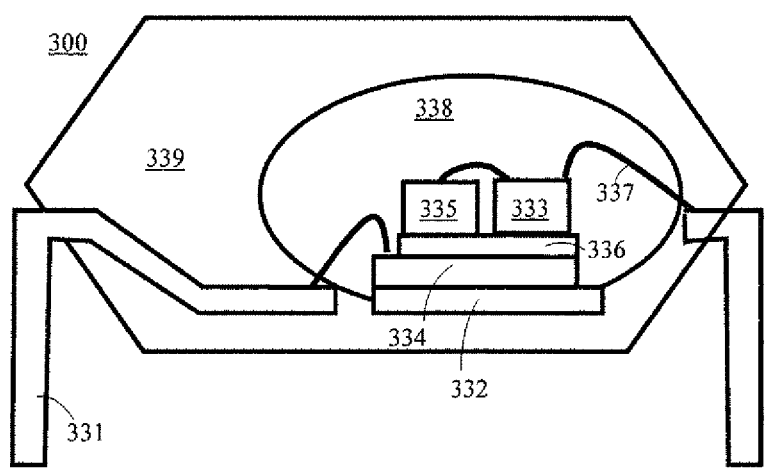
FIG. 3 illustrates a cross-sectional view of an opto-isolator package.

FIG. 3 illustrates a cross-sectional view of an opto-isolator package 300. The opto-isolator package 300 may comprise a plurality of leads 331, a die attach pad 332, a photo emitter die 333, a photo detector die 334, an optional compensation circuit die 335, an electrical isolation layer 336, an encapsulant 338, and an optional opaque encapsulant 339. A portion of one of the leads 331 may be extended to define the die attach pad 332 configured to accommodate the photo detector die 334. The photo detector die 334 may be larger than the photo emitter die 333, as well as the optional compensation circuit die 335. Therefore, the photo detector die 334 may be configured to receive the photo emitter die 333 and the optional compensation circuit die 335 as shown in FIG. 3.

For the purpose of electrically isolating the photo detector die 334 from the photo emitter die 333, the electrical isolation layer 336 may be disposed on the photo detector die 334, and subsequently the photo emitter die 333 and the compensation circuit die 335 may be disposed on the electrical isolation layer 336. Alternatively, the photo emitter die 333 and the compensation circuit die 335 may be disposed on another one of the plurality of leads 331. However, stacking up the dies 333, 334, 335 as shown in FIG. 3 may reduce space needed for the opto-isolator package 300. The electrical connections between the dies 333, 334, 335 may be established through wire bonds 337.

The compensation circuit die 335 may comprise the trigger generator 270, the driver compensation circuit 280 and the threshold compensation circuit 290 shown in FIG. 2A. However, as explained earlier, the trigger generator 270 and the driver compensation circuit 280 may reside in the photo emitter die 333 whereas the driver compensation circuit 280 may reside in the photo detector die 334 in another embodiment. The embodiment shown in FIG. 3 may be lead frame package, but in another embodiment, the package may comprise a printed circuit board with the plurality of leads 331 being the conductive traces of the printed circuit board.

The encapsulant 338 may be substantially transparent to the light emitted by the photo emitter die 333. The encapsulant 338 may not be transparent to human eye as the light may include invisible light such as infra-red light as explained earlier. The encapsulant 338 may be silicone, epoxy or any other similar material suitable to encapsulate the photo emitter die 333, the photo detector die 334, and the optional compensation circuit die 335. The optional opaque encapsulant 339 may be opaque to the light emitted from the photo emitter die 333. In some applications, the light emitted by the photo emitter die 333 may be blocked within the opto-isolator package 300 because the light may become noise to other electronic components (not shown) or to human eyes. For these applications, the encapsulant 338 may be required to be covered by the opaque encapsulant 339.

Figure 4A:
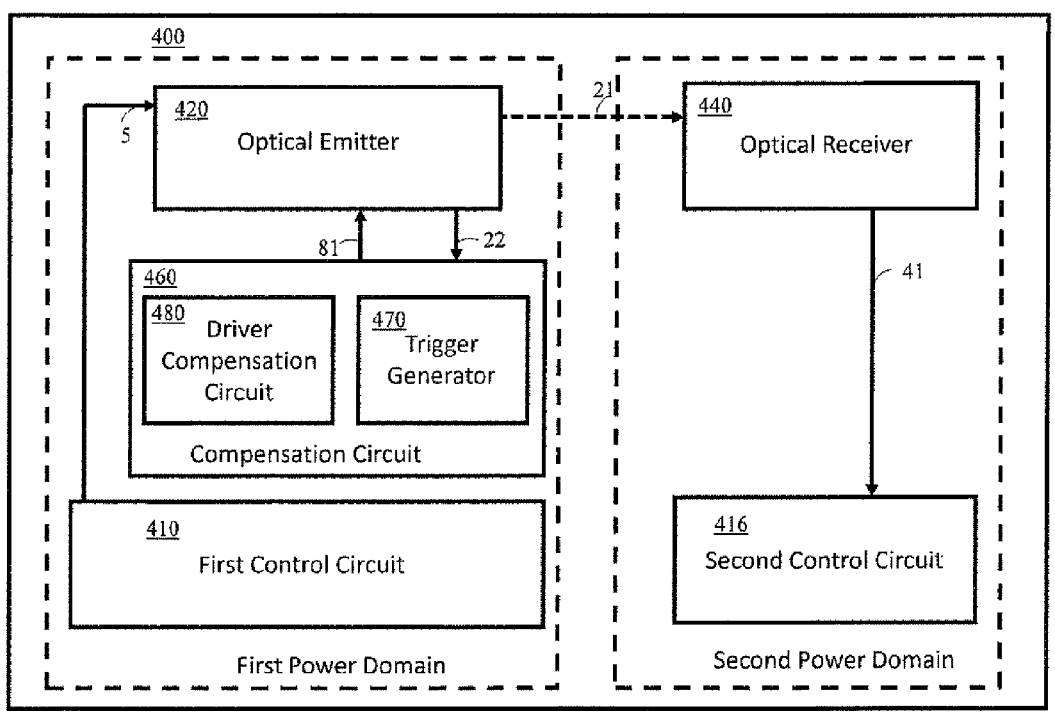
FIG. 4A illustrates a block diagram of an electrical control system.

FIG. 4A illustrates a block diagram of an electrical control system 400. The electrical control system 400 may comprise a first control circuit 410, a second control circuit 416, an optical emitter 420, an optical receiver 440 and a compensation circuit 460. The compensation circuit 460 may comprise a driver compensation circuit 480 and a trigger generator 470. The first control circuit 410 may be configured to control a first system (not shown) whereas the second control circuit 416 may be configured to control a second system (not shown).

Figure 4B:
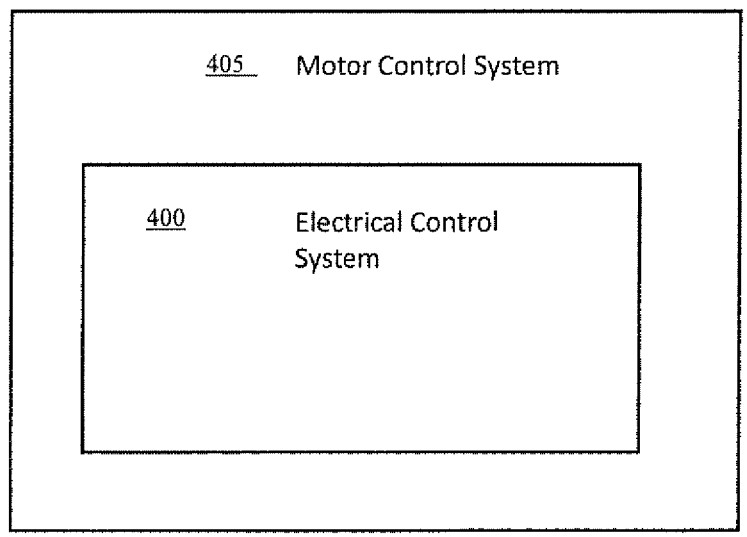
FIG. 4B illustrates a block diagram showing the electrical control system in FIG. 4A being used in a motor control system.

For example, the electrical control system 400 may be part of a motor control system shown in FIG. 4B. The motor control system 405 may be configured to control a robot arms and machineries operating in different power domains. For example, the motor control system 405 may be a motor control system 405 of an automobile assembling and manufacturing line. The first control circuit 410 of the motor control system 405 may be configured to control a first robot arm used to assemble windshield where as the second control circuit 416 may be a configured to control a second robot arm used to assemble the body of the automobile.

In another embodiment, the motor control system 405 may be used in a testing system configured to testing electronic semiconductor devices. The first circuit 410 may be a control system of the robot arm configured to transport each electronic semiconductor devices to a predetermined location whereas the second control system 416 may be electrical tester system. In yet another embodiment, the electrical control system 400 may further comprise a third or more control circuits (not shown). The electrical control system 400 may be part of an electrical system (not shown) for controlling various electrical circuits without any moving parts in another embodiment.

As shown in FIG. 4A, the first and second control circuits 410, 416 may reside in different power domains. For example, the first control circuit 410 may be located in the first power domain 112 whereas the second control circuit 416 may be located in the second power domain 118. The first and second control circuits 410, 416 may be electrically isolated for several reasons. For example, the first power domain 112 may have too much noise for the second control circuit 416. The requirement that the first and second control circuits 410, 416 being operated in different voltage may be another reason for the electrical isolation. Being resided in different power domains, the first and second control circuits 410, 416 may transmit signals to each other via optical signals and not via electrical signals. For example, an input electronic signal 5 from the first control circuit 410 may be transmitted to the optical emitter 420 so that the input electrical signal 5 may be converted into an optical signal 21. The optical receiver 440 detects the optical signal 21. The optical receiver 440 may transform the optical signal 21 into an output electrical output signal 41 to the second control circuit 416.

Figure 4C:
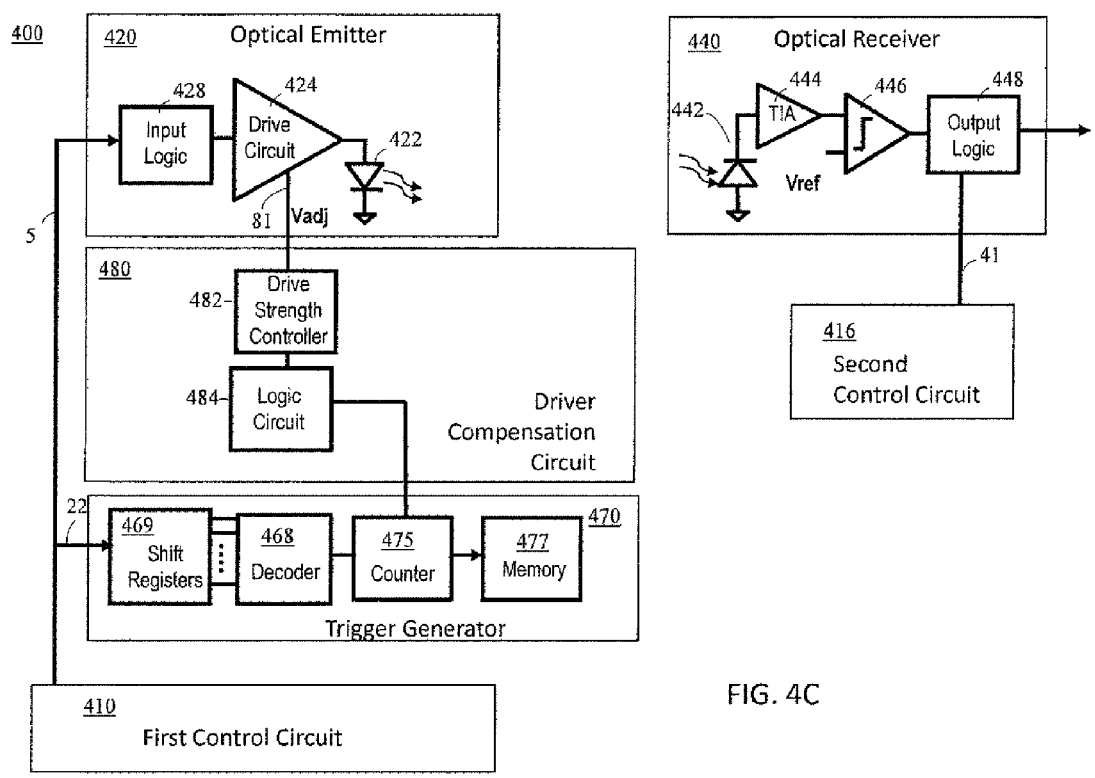
FIG. 4C illustrates a circuit diagram of the electrical control system shown in FIG. 4A.

FIG. 4C illustrates a circuit diagram of the electrical control system 400 shown in FIG. 4A. The optical emitter 420, the driver compensation circuit 480, and the optical receiver 440 may be similar to the embodiment shown in FIG. 2. The trigger generator 470 may comprise a shift register 469, a decoder 468, a counter 475 and a memory 477. The trigger generator 470 may have an input terminal 22 coupled to the electrical input signal 5 generated from the first control circuit 410. The trigger generator 470 may be configured to monitor the input signal 5 through the shift register 469 and the decoder 475 for a specific command that may associate with motor control events that associate with extended use of the optical emitter 420. Upon such motor control events, the counter 475 may be configured to count incrementally. The memory may be configured to store the value of the counter 475.

Figure 4D:
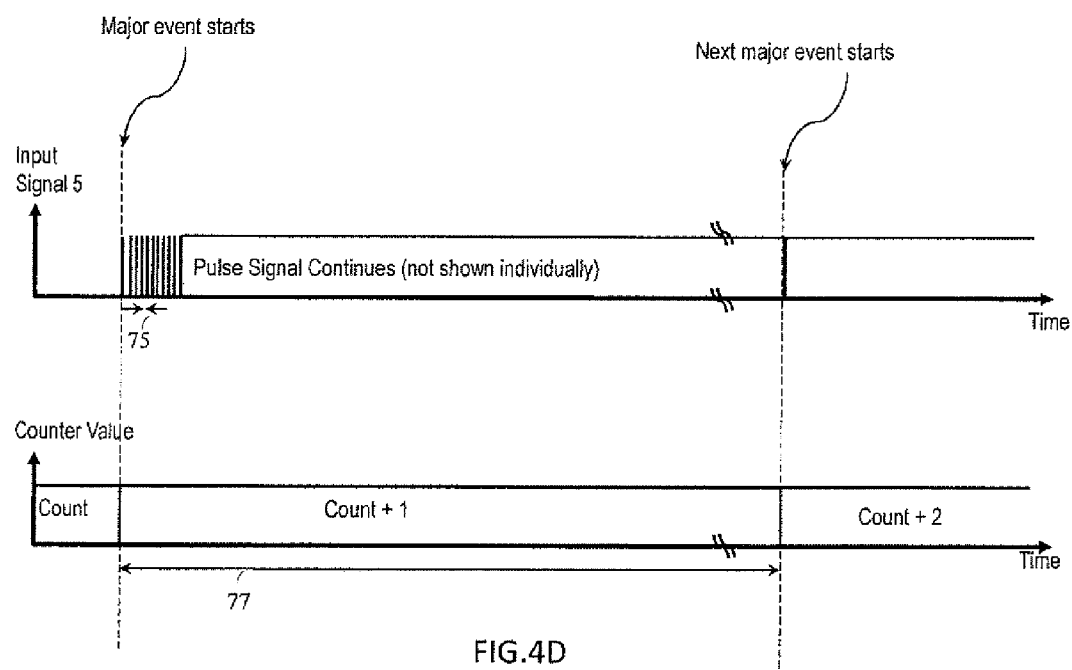
FIG. 4D illustrates a timing chart of the circuit diagram shown in FIG. 4C.

As illustrated by the timing diagram shown in FIG. 4D, after a major event occurred in the motor control system 405, a huge number of pulse signals may be transmitted via the optical emitter 420. As illustrated in FIG. 4D, the input signal 5 that is indicative of the optical signal 22 may have a huge number of pulses. Each of the pulse may have a fixed predetermined on-period 75. The number of pulses may not be monitored but instead, the counter 475 may be configured to count incrementally in respond to detection of the major motor control events occurred in the motor system 405. The motor control events will be explained in further details hereinafter. As shown in FIG. 4D, the period between events (also referred an extended use period 77) may include more than 10,000 pulses or more than 10,000 times of the fixed predetermined on-period 75. If the counter 475 exceeds a predetermined count value, a signal may be transmitted to the driver compensation circuit 480 to adjust the drive strength of the drive circuit 424.

The shift register 469 and the decoder 468 may be optional and may be omitted in another embodiment. The first control circuit 410 may be configured to send a control signal (not shown) directly to the trigger generator 470 in the event of such major motor control events occur. Such major motor control events may be predefined. Usually, the motor control events may be associated with a condition of the motor control system that may lead to a substantial optical signal 21 transmission by the optical emitter 420. For example, consider a tester control system. Upon completion of a testing event, the test result may be transmitted over from a first control system 410 to the second control system 416. Test result may be huge, indicating that a huge number of optical signals may be transmitted over after such testing event. Therefore, counting major event such as the completion of test event may represent a substantive extended use of the optical emitter 420.

Consider another embodiment where the motor control system 405 is used to control a robot arm. The robot arm may be configured to perform a limited set of motions. For example, rotational, lateral movement to specific direction etc. There may be a few known predetermined sets of motion sequence performed by the robot arms. Each set of motion sequence may comprise multiple steps of motions. In such application, each motion sequence may be a motor control event, in which each of these events may be indicative of an extended use of the optical emitter 420. Counting such sequence may be equivalent to a coarse estimation on the use of the optical emitter 420. The method of counting motor control events may not be precise as each of the events may require different usage length. However, such coarse calculation or estimation based on counting the events may be sufficient for the purpose of generating compensation signals.

Different aspects, embodiments or implementations may, but need not, yield one or more of the following advantages. For example, the compensation circuit may extend service life of the opto-isolator, when the light source degrades. Further, the size of the capacitor 272 illustrated in FIG. 2B may be advantageous as careful selection of the capacitor size may provide for reducing the size of counter 275.

Although specific embodiments of the invention have been described and illustrated, the invention is not to be limited to the specific forms or arrangements of parts so described and illustrated. It is to be understood that the illustration and description shall not be interpreted narrowly. For example, the light source 222 shown in FIG. 2B may be an LED, but may also be a die with an integrated LED and circuitry or a light source using future technologies. The scope of the invention is to be defined by the claims appended hereto and their equivalents.

What is claimed is:

1. An opto-isolator for electrical isolation of an electrical input signal from an electrical output signal, the opto-isolator comprising:
    an optical emitter configured to generate emitted light for at least a plurality of fixed predetermined on-periods in response to the electrical input signal;
    an optical receiver arranged proximate to the optical emitter to receive a first portion of the emitted light and configured to generate the electrical output signal in response to the emitted light;
    a counter configured to count incrementally number of substantial use that takes place over a predetermined extended use period of the optical emitter;
    a compensation circuit configured to send a compensation signal to at least one of the optical emitter and the optical receiver when the counter exceeds a predetermined count value; and
    a switch capacitor circuit having a capacitor that is configured to be accumulatively charged in response to a pulse signal being on for the fixed predetermined on-period when the optical emitter is configured to generate emitted light, and a switch that resets the capacitor after the charge stored in the capacitor exceeds a predetermined value;
    wherein the predetermined extended use period is substantially longer than the plurality of fixed predetermined on-periods.

2. An opto-isolator as recited in claim 1, wherein the compensation circuit comprises a trigger generator configured to monitor usage of optical emitter and configured to trigger the compensation signal.

3. An opto-isolator as recited in claim 1, wherein the capacitor is configured to be accumulatively charged when the optical emitter is generating the emitted light.

4. An opto-isolator as recited in claim 1, wherein the trigger generator further comprises a non-volatile memory.

5. An opto-isolator as recited in claim 2, wherein the compensation circuit further comprises a driver compensation circuit coupled to the trigger generator and configured to adjust the optical emitter.

6. An opto-isolator as recited in claim 5, wherein the optical emitter comprises a light source and an adjustable drive circuit configured to drive the light source at different drive strength in accordance to the driver compensation circuit.

7. An opto-isolator as recited in claim 2, wherein the compensation circuit further comprises a threshold compensation circuit configured to adjust the optical receiver in response to the compensation signal.

8. An opto-isolator as recited in claim 7, wherein the threshold compensation circuit comprises an adjustable threshold circuit configured to set a threshold level determined by the trigger generator.

9. An electrical control system, comprising:
- a first control circuit configured to generate a first signal;
- an optical emitter coupled to the first control circuit and configured to generate emitted light for at least a plurality of fixed predetermined on-periods in response to the first signal;
- a second control circuit;
- an optical receiver coupled to the second control circuit for receiving a portion of the emitted light that is indicative of the first signal;
- a counter configured to count incrementally after a predetermined extended use period of the optical emitter;
- a trigger generator configured to generate a trigger signal when the counter exceed a predetermined count value, wherein the trigger generator comprises a capacitor configured to accumulate charge, and a switch for resetting the charge accumulated in the capacitor when the charge accumulated exceeds a threshold value indicative of extended usage; and
- a compensation signal generator coupled to the trigger generator and configured to send a compensation signal to at least one of the optical emitter and the optical receiver in response to the trigger signal;
- wherein the predetermined extended use period is substantially longer than the plurality of fixed predetermined on-periods.

10. An electrical control system as recited in claim 9 forms part of a motor control system.

11. An electrical control system as recited in claim 10, wherein the trigger generator is configured to accumulatively count motor control events indicative of extended use of the optical emitter in response to a condition of the motor control system.

12. An electrical control system as recited in claim 9, wherein the extended use of the optical emitter is at least more than 1000 times the predetermined on-period.

13. An electrical control system as recited in claim 9, wherein the switch is additionally configured to discharge the charge accumulated in response to a control signal from one of the first and second control circuits.

14. An electrical control system as recited in claim 9, wherein the trigger generator further comprises a non-volatile memory for storing the value of the counter.

15. An electrical control system as recited in claim 9, wherein the counter is configured to count incrementally number of substantial use that takes place over the predetermined extended use period of the optical emitter.

16. An electrical control system as recited in claim 9, wherein the optical emitter comprises a light source and an adjustable drive circuit configured to drive the light source at different drive strength in accordance to the driver compensation circuit.

17. An electrical control system as recited in claim 9, wherein the capacitor is configured to be charged when the optical emitter is generating the emitter light.

18. An opto-isolator for electrical isolation of an electrical input signal from an electrical output signal, the opto-isolator comprising:
- an optical emitter configured to generate emitted light for at least a fixed predetermined on-period in response to the electrical input signal;
- an optical receiver arranged proximate to the optical emitter to receive a first portion of the emitted light and configured to generate the electrical output signal in response to the emitted light; and
- a switch capacitor circuit having a capacitor for incrementally storing charge in accordance with usage of the optical emitter die, and a switch configured to reset the capacitor after the charge stored in the capacitor exceeds a predetermined value;
- an incremental counter configured to count incrementally when the switch is reset;
- a memory for storing a value of the incremental counter; and
- a control circuit configured to generate a trigger signal when the value of the incremental counter exceeds a predetermined count.

19. An opto-isolator as recited in claim 18, wherein the opto-isolator forms a portion of a motor control system.

20. An opto-isolator as recited in claim 18, wherein the optical emitter comprises a light source and an adjustable drive circuit configured to drive the light source at different drive strength in accordance with the driver compensation circuit.

* * * * *